July 2, 1935.  R. J. LACKNER  2,006,359
NUT LOCK
Filed July 3, 1933
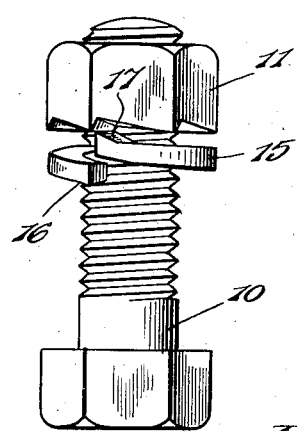
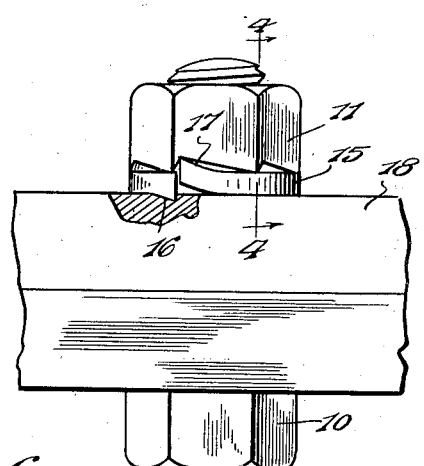
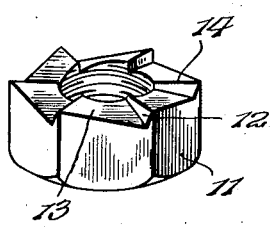
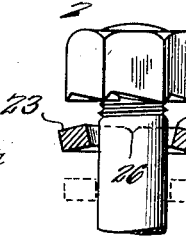
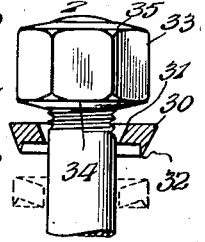
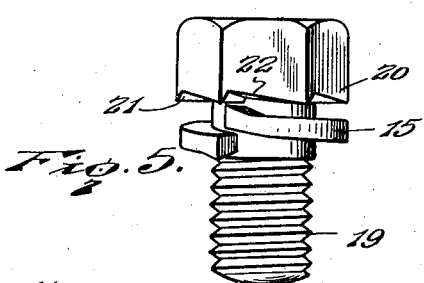
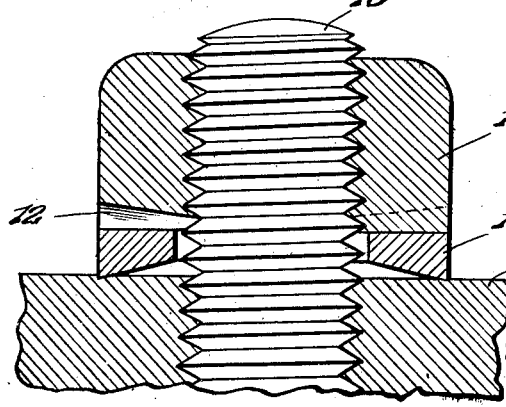
Inventor
R. J. Lackner.
By Lacey & Lacey
Attorneys Patented July 2, 1935

2,006,359

UNITED STATES PATENT OFFICE 2,006,359

NUT LOCK

Rolph J. Lackner, Ozone Park, N. Y.

Application July 3, 1933, Serial No. 678,958

1 Claim. (Cl. 151—39)

This invention relates to an improved nut lock and seeks, among other objects, to provide a device of this character embodying a nut provided at its inner side with a ratchet face of peculiar construction adapted to cooperate with a split washer and wherein the shoulders of the nut will not only be beveled or inclined to obtain greater strength through the presence of more metal at the shoulders as compared with straight vertical shoulders but wherein the inclined shoulders of the nut will also be tapered in width to present a greater bearing area adjacent the outer periphery of the nut.

The invention seeks, as a further object, to provide a device embodying a locking washer of novel construction adapted to selectively coact with the shoulders of the nut in such a way that retrograde strain of the nut on the washer will be distributed toward the outer circumference of the washer.

And the invention seeks, as a still further object, to provide a device wherein the washer will be so formed that as the nut is tightened, the washer will be caused to gouge into the work to provide an effective lock for the nut.

With the foregoing and other objects in view, the invention consists in certain novel details of construction and combination of parts hereinafter fully described and claimed, it being understood that various modifications may be resorted to within the scope of the appended claim without departing from the spirit or sacrificing any of the advantages of the invention.

In the accompanying drawing, Fig. 1 is an elevation showing a conventional bolt equipped with my improved nut and washer, Fig. 2 is an elevation showing the nut designed to coact with the washer, Fig. 3 is a detail perspective view showing the nut inverted, Fig. 4 is an enlarged sectional view on the line 4—4 of Fig. 2, Fig. 5 is an elevation showing a modification of the invention applied to a cap bolt, Fig. 6 is a detail elevation showing a modified form of locking washer, Fig. 7 is a detail elevation showing another modified form of locking washer, Fig. 8 is a detail elevation showing still another modified form of locking washer as well as a modified form of nut.

Referring now to the drawing and particularly to Figs. 1, 2, 3 and 4, I have shown a conventional bolt at 10 and screwed on the bolt is a nut 11. As shown in detail in Fig. 3, the inner side of the nut is stepped to provide a plurality of inclined radial shoulders 12 which extend obliquely to the axis of the nut, the nut being formed with intervening tread surfaces 13 inclining from the base of one shoulder, respectively, to the free radial edge 14 of the next succeeding shoulder. The nut is thus provided at its lower side with a ratchet face.

Attention is directed to the fact that the tread surfaces 13 of the nut are not only inclined circumferentially of the nut from each shoulder to the next, respectively, but are also tilted radially so that the shoulders 12 are tapered in width from their outer ends, at the outer periphery of the nut, to their inner ends at the bore of the nut. In thus tapering the shoulders and tilting the tread surfaces 13, it is necessary to cut away a correspondingly reduced amount of metal at the bore of the nut so that for a nut of given thickness, a maximum number of treads may be employed. Furthermore, the shoulders 12 each provide a bearing area gradually increasing in width toward the outer circumference of the nut. Similarly, by obliquely tilting the shoulders 12, more metal is present at each shoulder, as compared with a straight vertical shoulder and, accordingly, it may be said that the shoulders 12 are reinforced. As will be observed, the edges 14 of the shoulders 12 are straight and all lie in the same plane.

In conjunction with the nut 11, I provide a split resilient washer 15, the ends of which are normally disposed out of register. The upper face of the washer is flat while the lower face thereof is, as particularly seen in Fig. 4, of cone-shape, the washer being tapered in thickness from its outer circumference to its inner circumference. Near one end, the washer is thickened at its lower side only, to provide a beveled shoulder 16 inclining from the adjacent end of the washer while, near its opposite end, the washer is thickened at its upper side only, to provide a similar inclined shoulder 17 sloping from the latter end of the washer.

In Figs. 2 and 4 of the drawing I have shown the nut 11 tightened on the bolt 10. After the bolt has been inserted through the work, conventionally illustrated at 18, the washer 15 is applied to rest against the work after which the nut is tightened in the usual way to coact with the washer. As will be seen, the shoulder 16 at one end of the washer will tend to gouge into the work while the shoulder 17 at the other end of the washer will, as the nut is turned, ride over the shoulders 12 of the nut until the nut is completely tightened when the adjacent end face of the washer will coact with one of the shoulders 12, as shown in Fig. 2, for locking the nut against retrograde movement. Due to the oblique tilt of the shoulders 12, the end of the washer which coacts with the nut will, as the nut is tightened, be prevented from suddenly snapping off of the shoulders onto the surfaces 13 of the nut but will more or less gradually ride over the shoulders so that possibility of fracture of the shoulders or the free end of the washer will be correspondingly reduced.

When the nut is tightened, the major portion of the pressure on the washer 15 will, due to the shape of the washer at its lower side, be concentrated at the periphery of the washer so that retrograde strain on the nut will, in the main, be communicated to the peripheral portion of the washer. The washer will thus not only be caused to gouge into the work at its lower peripheral edge so as to frictionally coact with the work throughout the major portion of the circumference of the washer for resisting the retrograde strain of the nut but also the washer will most effectively coact with the nut adjacent its outer circumference and will thus obtain greatest radial leverage on the nut tending to hold the nut against retrograde movement. For such reason, the shoulders 12 are widened toward their outer ends so as to provide a correspondingly increased bearing area toward the outer periphery of the nut for the coacting end face of the washer.

In Fig. 5 of the drawing I have shown a slight modification of the invention embodying a cap bolt 19 having a head 20. In this variation, the head 20 is provided at its lower side with shoulders 21 like the shoulders 12 of the nut 11, and with tread surfaces 22 like the tread surfaces 13. One of the washers 15 is shown in position on the bolt.

In Fig. 6 of the drawing, I have illustrated another modification of the invention wherein I employ a split resilient cone-shaped washer 23 which is provided with an inverted cone-shaped bore 24. A nut, like the nut 11, is shown at 25 and, as will be seen, when the nut is tightened, the washer 23 will, as illustrated in dotted lines, be flattened against the work so that the greatest tension between the nut and washer will occur at the outer peripheral margin of the washer. If so desired, the washer may be provided with a notch 26 so that when it is desired to remove the nut the washer will fracture at such point without mutilating the nut.

In Fig. 7 of the drawing I have illustrated another variation of the invention wherein I employ a split resilient cone-shaped washer 27 provided at its lower side with a depending peripheral rib 28 V-shaped in cross section. A nut, like the nut 11, is indicated at 29 and as shown in dotted lines, the washer 27 will, when the nut is tightened, be flattened so that the rib 28 will be caused to gouge into the work. Accordingly, the greatest binding action between the washer and nut will occur at the outer peripheral margin of the washer.

In Fig. 8 of the drawing I have illustrated still another modification of the invention wherein I employ a split resilient washer 30 which is flattened and is provided with an inverted cone-shaped bore 31 while, at its lower side, the washer is formed with a peripheral V-shaped rib 32 like the rib 28. In this instance, I provide a nut 33 which is formed at its lower side with a cone face 34 while, if so desired, the nut may also be provided at its upper side with a similar cone face 35 so that the nut will thus be reversible. As shown in dotted lines in Figure 8 of the drawing, the cone face 34 of the nut will, when the nut is tightened, coact with the wall of the bore 31 of the washer and tend to spread the washer so that the rib 32 thereof will be caused to gouge into the work, the washer being dished somewhat between the work and the nut. Thus, the greatest binding action between the nut and washer will occur at the outer peripheral margin of the washer so that the greatest retrograde strain of the nut on the washer will occur adjacent the outer circumference of the washer while, also, the washer will have the greatest radial leverage on the nut.

Having thus described the invention, I claim:

In a nut lock, a bolt having a threaded shank, a split washer of a diameter to fit about the shank of said bolt, said washer being formed of resilient material and having a flat outer face and a concaved frusto-conical inner face tapered toward the inner peripheral edge of the washer in converging relation to the outer face, ends of said washer being offset axially of the bolt to provide the washer with a work engaging end portion and a nut engaging inclined shoulder of the other end portion of the washer extending in a direction opposite to that of the work engaging end portion, and a nut threaded upon the shank of said bolt and having its annular inner end face formed with tread surfaces extending at an incline circumferentially of the nut with their adjoining ends offset axially thereof and connected by uninterrupted shoulders extending continuously at a steep incline between the said ends, said tread surfaces being tapered toward the bolt receiving bore of the nut and disposed at a radial incline whereby said shoulders are gradually reduced in depth toward their inner ends.

ROLPH J. LACKNER.